(12) United States Patent
Robinson

(10) Patent No.: US 6,800,206 B2
(45) Date of Patent: Oct. 5, 2004

(54) ELECTROLYSIS BASED WATER TREATMENT

(75) Inventor: Vivian Noel Edward Robinson, Five Dock (AU)

(73) Assignee: Ozcent PTY Ltd., New South Wales (AU)

(*) Notice: Subject to any disclaimer, the term of this patent is extended or adjusted under 35 U.S.C. 154(b) by 85 days.

(21) Appl. No.: 10/221,055

(22) PCT Filed: Mar. 15, 2001

(86) PCT No.: PCT/AU01/00283
§ 371 (c)(1),
(2), (4) Date: Dec. 16, 2002

(87) PCT Pub. No.: WO01/68532
PCT Pub. Date: Sep. 20, 2001

(65) Prior Publication Data
US 2003/0106854 A1 Jun. 12, 2003

(30) Foreign Application Priority Data
Mar. 15, 2000 (AU) .......................... PQ 6238
Nov. 22, 2000 (AU) .......................... PR 1589

(51) Int. Cl.[7] .............................. C02F 1/461
(52) U.S. Cl. .................. 210/746; 210/748; 210/243; 204/555
(58) Field of Search ............... 210/703–707, 210/748, 746, 198.1, 205, 243, 221.1; 204/554, 555, 556, 660, 661; 205/742, 743, 757

(56) References Cited

U.S. PATENT DOCUMENTS

| 4,855,061 A | * | 8/1989 | Martin | 210/709 |
| 4,908,109 A | * | 3/1990 | Wright | 210/703 |
| 5,282,381 A | * | 2/1994 | Krone-Schmidt | 73/61.41 |

FOREIGN PATENT DOCUMENTS

| AU | 2248500 | 10/2000 |
| DE | 4416973 | 11/1995 |
| DE | 19642999 | 8/1997 |
| DE | 19819303 | 11/1999 |
| DE | 10146961 A1 | * 4/2003 |
| EP | 0074530 | 3/1983 |
| EP | 0341614 | 11/1989 |
| EP | 0623558 | 11/1994 |
| WO | WO 200386981 A1 | * 10/2003 |

OTHER PUBLICATIONS

Derwent Abstract English Translation of EP 623558 Dated Nov. 9, 1994.
Derwent Abstract Accession No. 85–091789/15 SU 1114–621–A Dated Sep. 23, 1984.
Derwent Abstract English Translation of DE 19819303 Dated Nov. 4, 1999.
Derwent Abstract English Translation of EP 341 614 Dated Nov. 15, 1989.
Derwent Abstract English Translation of EP 74530 Dated Mar. 23, 1983.
Derwent Abstract English Translation of DE 19642999 Dated Aug. 7, 1997.
Derwent Abstract English Translation of DE 4416973 Dated Nov. 16, 1995.

* cited by examiner

Primary Examiner—Frank M. Lawrence
(74) Attorney, Agent, or Firm—Ladas & Parry

(57) ABSTRACT

Water treatment involves delivering an instantaneous electric current to one or more pairs of activated electrodes immersed in the water, each of the pairs of electrodes comprising a sacrificial electrode operating predominantly as an anode and an inert electrode operating predominantly as a cathode. The sacrificial electrode, when as an anode, is able to provide dissolved ions to the water as current passes between the pairs of electrodes, to assist in treating the water. The polarity of the electrodes is periodically reversed to reduce electrode clogging. The amount of charge passed by the instantaneous electric current is indicative of the degree to which the water has been treated, and is used to control the treatment process.

16 Claims, 6 Drawing Sheets

ELECTROLYSIS BASED WATER TREATMENT

This application is a 371 of International Application No. PCT/AU01/00283, filed on Mar. 15, 2001, which designated the United States of America.

FIELD OF THE INVENTION

The invention relates to water treatment and relates particularly, though not exclusively, to treating polluted water using electroflocculation and/or electrocoagulation reactions.

BACKGROUND OF THE INVENTION

The ready availability of clean water is a key requirement for health and economic prosperity. Accordingly, the treatment of polluted water assumes a new importance with increasing population and consequent demands on fresh water supplies.

Electrolysis-based water treatment techniques represent one kind of method for treating polluted water. In this respect there are three different types of electrolysis-based water treatment processes:

(i) electroflotation;
(ii) electroflocculation; and
(iii) electrocoagulation.

Electroflotation involves the use of inert electrodes in conjunction with a coagulating agent which has been added to the polluted water to be treated. A voltage is applied to the electrodes, and liberated gas bubbles capture coagulated particles, floating them to the surface. This is similar to a process known as dissolved air flotation (DAF) for treating industrially polluted water—except that the gas bubbles are supplied by electrolysis of the water and not by compressed air. The process has been commercially available since the mid 1970s, and is generally described by Dr Anselm Kuhn in *Electroflotation—the technology and waste water applications*, Chemical Processing, IPC Industrial Press Ltd, London.

Electroflocculation uses sacrificial electrodes to generate the coagulating agent, but also uses the bubbles liberated at the electrodes to float the contaminants to the surface. A few electroflocculation processes have been attempted before but they have not been successful for various reasons. These limitations include:

the clogging of the electrodes before the metal has been adequately sacrificed; and the requirement to purpose build each unit for a particular application because of inability of a single set of electrodes to handle a wide array of water conductivities.

Electrode clogging considerably increases the cost of the treatment process due to the high cost of electrode replacement, typically making the process prohibitively expensive. The latter limitation has meant that it is necessary to tailor existing electroflocculation systems for particular water qualities. This has not been found to be a practical solution for commercial viability.

Electrocoagulation also involves the use of sacrificial electrodes to generate the coagulating agent—usually aluminium or iron ions. Once the water has been treated, it is either filtered, allowed to settle or sent to a gas or air flotation unit to remove the contaminants. Electrocoagulation process offers a number of potential advantages, if they can be realised. However, as with electroflocculation, electrocoagulation similarly suffers from problems of electrode clogging and the need for purpose building each system to the particular water to be cleaned.

The electrocoagulation process has been tried for many years but has not been made to work satisfactorily. For example, U.S. Pat. No. 4,872,959 to Herbst et al describes a tubular system in which the water passes between inner, outer and central electrodes, and is designed to add flocculating ions to settle the pollutants to the bottom of the settling tank into which the water will be passed. It uses iron and aluminium anodes, though suggests other metals as well, for example copper cathode, iron anode. It is not very successful because the electrodes have a tendency to clog. Further, the system is designed for specific conductivities of the water, and controlling the dose of coagulating ions required for a particular reaction is not easy.

U.S. Pat. No. 5,372,690 to Gardner-Clayson et al acknowledges that replacement of electrodes is a big problem and uses metallic, preferably aluminium, steel (alloy) or magnesium as method of overcoming the problem. Uses a layer of metal balls, shot, irregular shaped particles to be consumable, instead of sheet. Current is passed from metal anode to these balls etc., which then pass cations into the water and the process repeats itself. It has the problem that large voltages are required to drive the electric current between the anode and cathode. Also there is no guarantee that the metal particles in this shape are well suited for the passage of an electric current. Also, it does not address the problems of variations in electrical conductivity of the water.

U.S. Pat. No. 5,558,755 to Gardner-Clayson et al is based upon a continuation application of the patent noted directly above. The discussed apparatus includes a fluidised bed of metallic particles through which the medium is flowed and through which an electric current is applied by electrodes for agglomerating contaminants in the medium. In order to allow the electrodes to be non-consumable so that they do not require frequent replacement, the particles are consumable.

In both electrocoagulation and electroflocculation, there has been a tendency to use electrodes of the same material, for example, an aluminium anode and an aluminium cathode. In this case, a significant problem is that the electrodes have clogged because of the build up of an oxide type layer across the surface of the electrodes. Aluminium is deliberately oxidised in a process known as anodising, and it is generally thought that the aluminium went into solution at the anode. As a result, it has been considered difficult to overcome this problem of aluminium going into solution at the anode without forming an oxide layer at the anode.

In essence, existing techniques generally suffer from one or more limitations, such as:

The electrodes continually clog up, long before the metal had been adequately sacrificed into solution. This meant that the metal electrodes must be replaced at a high cost, making the process uneconomic.

Variations in the conductivity of the water meant that the process was often difficult to control.

Variations in the amount of pollutant present meant that installations had to be configured for a particular water quality. This again made commercial viability difficult.

It is an object of the present invention to at least attempt to address one or more of these and other limitations associated with existing techniques.

SUMMARY OF THE INVENTION

It has been recognised that aluminium goes into solution at the cathode as well as at the anode, and that the reaction rate at the cathode is around 2.5 to 3 times faster than at the anode. The cathode is also the electrode at which hydrogen gas is liberated, generating hydroxide groups and raising the pH of the water. Aluminium is an amphoteric metal and reacts with alkaline radicals (OH⁻) as well as with acidic conditions (H⁺). At the cathode, OH⁻ reacts with water and aluminium to form an insoluble $AL(OH)_3$, which adheres to the cathode, while at the anode, aluminium only goes into solution without forming an oxide layer.

The invention recognises that a water treatment process can be advantageously provided by using the electroflocculation/electrocoagulation principle, in which two electrodes are used in combination. A voltage is applied across the electrodes, with a positive voltage being applied to a sacrificial anode and a negative voltage applied to an inert cathode. This voltage can be either direct current (DC) or rectified alternating current.

The polarity of the electrodes can be periodically reversed to mitigate surface clogging of the aluminium electrode. Reversing the polarity causes the material attracted to one polarity to be driven off by repelling the material which was attracted. Repulsion can occur in a short time interval compared to that which results in clogging due to electric attraction. Reversing the polarity for small periods of time, between a broad duty cycle range of 0.1% and 30% of the time, reduces the build up of electrically deposited material, thus extending effective electrode lifetime.

Using a predetermined amount of charge as an indication of the degree to which the water is treated allows for greater flexibility in the manner in which the water can be conveniently treated allowing, for example, variations in water conductivity to be readily accommodated. A total charge, in terms of Ampere-hours, passed between the electrodes is found to be an effective measure of degree to which the water has been treated, and can accordingly be used to secure appropriate treatment results.

The invention provides a method of treating water by electrolysis by passing a current between an anode and a cathode. The invention also provides a water treatment unit having a storage tank for holding water in which an anode and cathode are immersed for treating the water by electrolysis. The invention further provides a power supply apparatus suitable for use in assisting to perform the inventive method described above. In one aspect of the invention, the direction of the instantaneous electric current passed between the electrodes is periodically reversed to discourage clogging of the sacrificial electrode, so that the sacrificial electrode acts primarily as an anode and the inert electrode acts predominantly as a cathode. In another aspect of the invention, the instantaneous electric current is delivered so that a predetermined amount of charge is passed through the water, the predetermined amount of charge being indicative of a degree to which the water has been treated.

In preferred embodiments, a series of electrodes can desirably be used to accommodate water of varying conductivity. The number of electrodes used can be externally selectable, so that if the conductivity decreases more electrodes are switched in to increase the area and thus get greater current from the same voltage. If the conductivity increases too much, so that the voltage decreases significantly, some of the electrodes which are switched out to decrease the area thus provide a higher voltage for the same current.

In a preferred form, a batch process is used in which contaminated water is pumped into a reactor. The electrodes are activated, causing some of the material to go into the water to form a coagulating agent which attaches itself to the pollutant particles (molecules, ions etc). Simultaneously, liberated gas bubbles capture the coagulated pollutants and float them to the surface from where the pollutants are easily removed.

A power supply and electrode combination can be used in which the sacrificial electrodes are worn away until they are almost entirely used up. The cost of sacrificial electrodes equates to USD 0.10 to USD 0.30 of metal per 1,000 litres of water treated, depending upon the degree of treatment required (that is, pollution encountered). Substantial cost savings compared with other water treatment methods are possible by almost completely consuming sacrificial electrodes.

A preferred embodiment is able to effectively treat water of varying conductivity, without needing to be specifically designed for treatment of a particular water type, or necessarily requiring regular monitoring and adjustment by an operator.

Water is pumped into a tank, the electrodes activated, the pollutant removed from the top and the processed water pumped out. The process repeats itself until such time as there is either no raw water available for processing or the processed water is receiving tank is full. The one system can handle a wide range of pollutants including most materials removed by particle filters, micro filtration and ultra filtration systems, ie, suspended solids down to and including large dissolved molecules, emulsified fats oils and greases (FOGs), heavy metal cations and phosphates among others. Suspended solids include bacteria, parasites, algae, paint and other pigments, carbon black, asbestos fibres, industrial grit, clay and similar.

The described system is able to treat water polluted with large dissolved molecules including humus, dye molecules, proteins, latex and polymers and similar. The system does not remove small non-polar molecules such as sugars, pesticides and similar. Nor does it remove low atomic number cations or anions (for example, it does not remove salinity). Removal rates are typically greater than 98%, with removal rates greater than 99.95% possible in some circumstances.

DETAILED DESCRIPTION OF EMBODIMENTS AND BEST MODE

An embodiment of the invention is described in the context of the treating batches of contaminated water with reference to the accompanying drawings.

Figure 1:
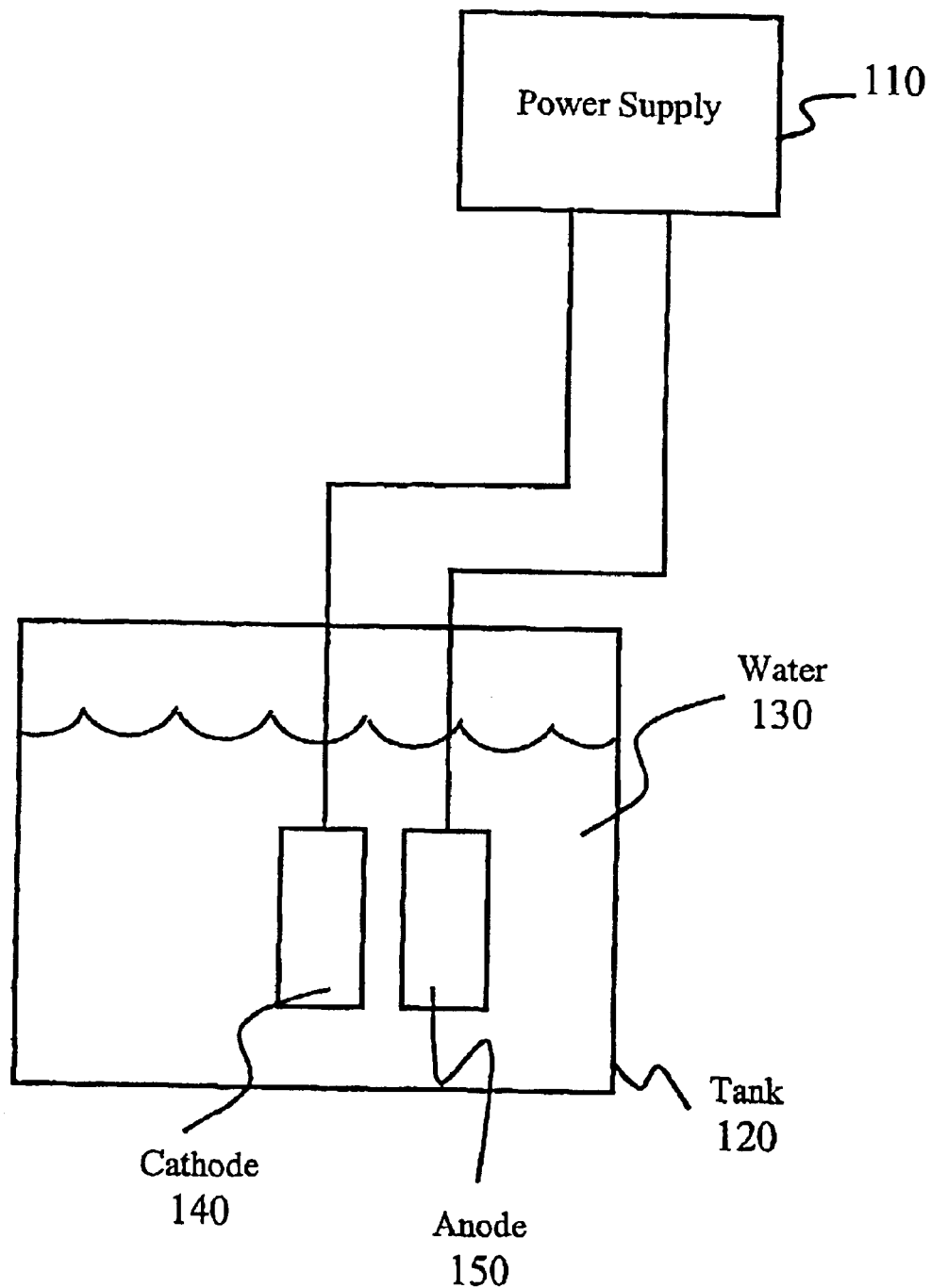
FIG. 1 is a schematic representation of the primary features of a water treatment unit constructed in accordance with an embodiment of the invention.

FIG. 1 schematically illustrates the features of such a system. A power supply 110 supplies current to two electrodes: a cathode 140 and an anode 150, both of which are immersed in water 130 held by a storage tank 120. The described treatment method depends upon the passage of an electric current between the two electrodes, one of which is of sacrificial material, typically aluminium or iron, and the other of an electroaqueously "inert" material, such as stainless steel.

The current passes through the water 130, between the anode and cathode. At the cathode, hydrogen gas is released. At the anode, the sacrificial metal goes from the anode into solution as a metal ion of the sacrificial material.

Figure 2:
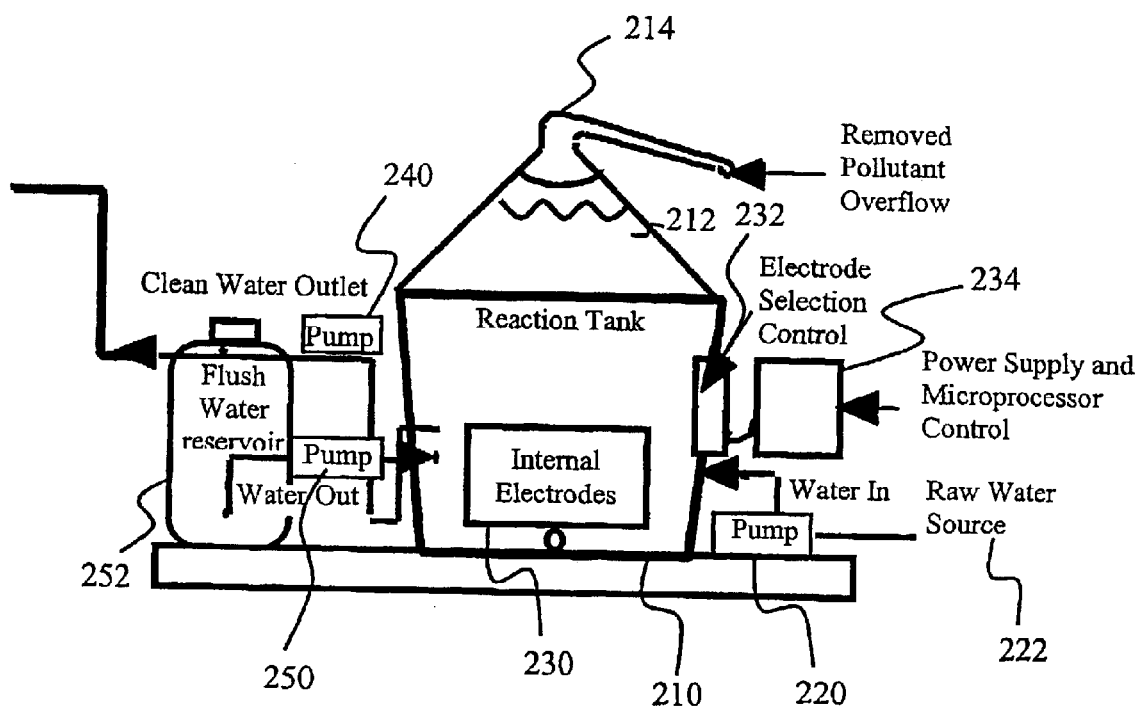
FIG. 2 is a schematic representation of a water treatment unit constructed in accordance with the invention, the primary features of which are represented in FIG. 1.

FIG. 2 shows the features of an operating system incorporating the features of FIG. 1. A storage tank 210 receives and stores water 212 to be treated via pump 220 which supplies from a raw water source 222. Electrodes 230 operating within the tank 210 are activated by an electrode selection control 232 which is, in turn, connected with a power supply 234 under microprocessor control as later described.

A flue 214 connected at the top of the tank 210 provides a means of removing pollutants from the treated water 212. A pump 240 is provided to pump water 212 from the tank after treatment by the electrodes 230. A further pump 250 feeds the tank 210 from a water reservoir 252 for periodically flushing the tank 210 as part of a scheduled maintenance procedure.

The constructional features and operation of the described water treatment process are outlined in further detail below.

Figure 3:
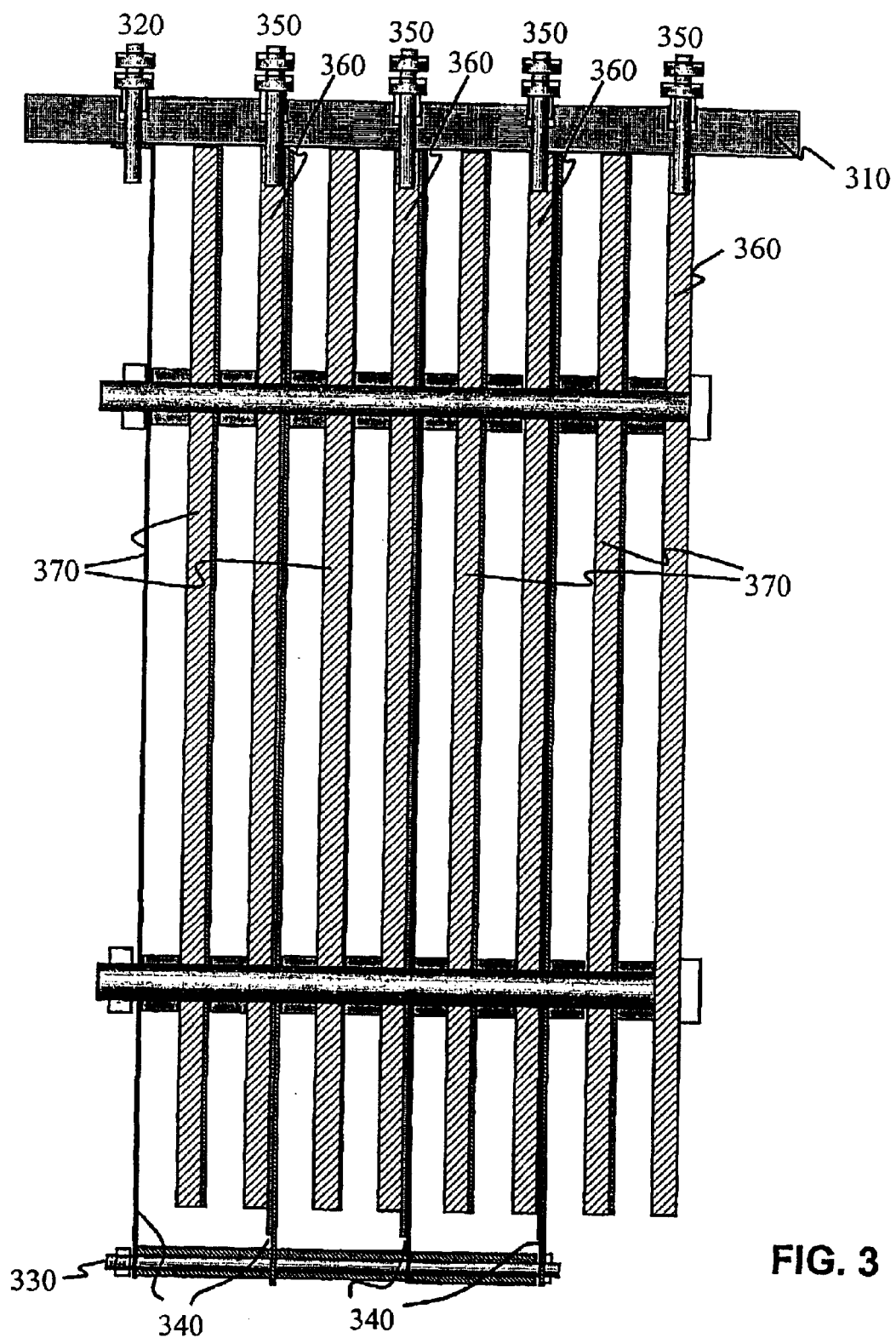
FIG. 3 is a schematic representation of a multiple electrode array that can be used in the water treatment unit of FIG. 2.
Figure 4:
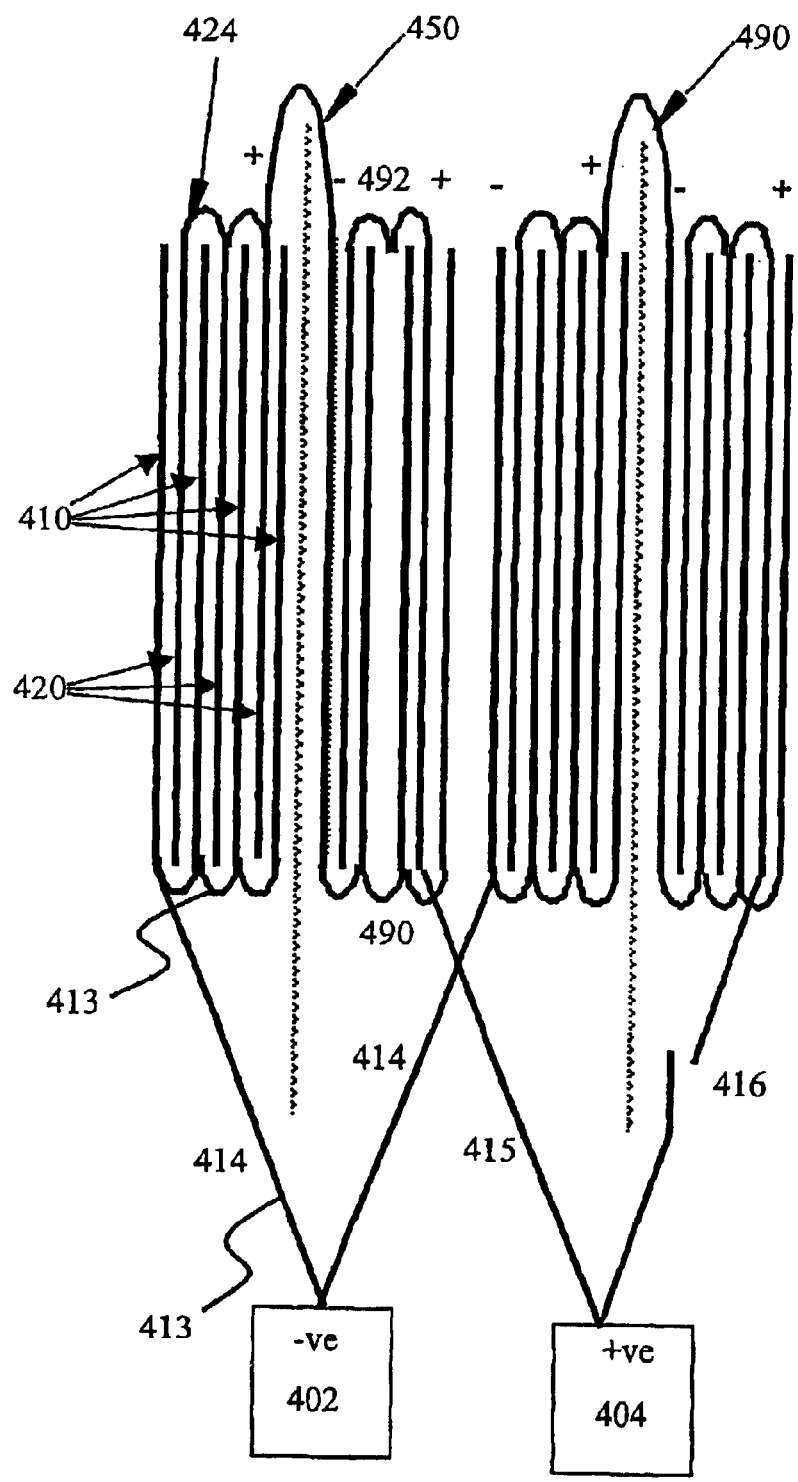
FIG. 4 is a schematic representation of a double electrode array that can be used in the water treatment unit of FIG. 2, as an alternative to the electrode array of FIG. 3.

FIGS. 3 and 4 illustrate alternative electrode arrays suitable for use in the described arrangements of FIGS. 1 and 2.

FIG. 3 illustrates an example of a suitable electrode arrangement in which the cathodes 340 are common for all electrode sets, and the anodes are independently selectable. Unless a particular anode set is selected, there will be no current passing through that anode.

The mounting plate 310 can be bolted onto the side of a reactor tank. The cathode feed through 320 is connected to the cathode common carrier 330, which is in turn connected to all the cathodes 340. Each separate anode feed through 350 is connected to an individual anode 360 which is independently selectable.

Between each set of anode/cathode electrodes 360/340 is a neutral 370, in this case a combination of aluminium and stainless steel. A mounting mechanism involving a bolt and spacer set holds the electrode sets together. Only when an anode 360 is selected does the reaction occur between the electrode set including that anode 360.

In this manner, all anodes 360 can be activated when the water to be treated is of relatively low conductivity and only, for example, one anode 360 activated when the water is of relatively high conductivity.

The remaining adjustments are done by the power supply. Any arbitrary number of independently selectable anodes may be employed.

It should be noted in the arrangement shown in FIG. 3 that the electrical charge passes through two sets of electrodes 340/360 in their passage from the negative to the positive of the power supply. They firstly pass out of the cathode 340 through the water to the neutral 370, in this case consisting of an aluminium and stainless steel electrode combined, entering through the aluminium and passing out through the stainless steel. In this mode, each electron reacts twice and, as such, the current reading of the electrodes should be doubled to get the appropriate anode amp hours measurement.

FIG. 4 illustrates an alternative electrode arrangement to that of FIG. 3. In this situation, three anodes 420 and four cathodes 410 form a group of electrodes. The cathodes are connected to the negative power supply 402 via cables 414 and within each group are connected to each other via the cables 413.

Likewise, the anodes 420 are connected to each other via connectors 424. The anode 420 of the first group was connected to the cathode of the second group via the cable 450. All the cathodes of the second group are connected together via cable 490 and the anodes are connected to each other via the connectors 492.

This anode is connected to the positive terminal 404 via the connector 415. This may be selectable via a switch 416, as is the second set, or may be permanently attached. It is easy to see that the electrons pass from the negative power supply 402, to the cathode of the first set, through the solution to the anode of the first set, from there they pass directly to the cathode of the second set and from there through the solution to the anode of the second set and from there back to the power supply positive 404. This means each electron passes twice through an electrode set, doubling the effect of the current. The second pair of sets is a repeat of the first pair of sets, and may be selectable. Control of the current could simply be via switching on the second pair of sets when the current was too low, or switching it off when the current becomes too high.

In this case, a combination of electrodes is selectable so that either one set or both sets operate in parallel. In the arrangements of both FIGS. 3 and 4, electrons travel from the cathode of one through the solution to the anode of the same group, then directly to the cathode of the second group, going through the solution to the anode of that same group and finally on to the anode of the power supply. Each electron passes twice through a set of electrodes and water, meaning that the reaction is twice that which would otherwise be expected from the passage of electric current.

Figure 5:
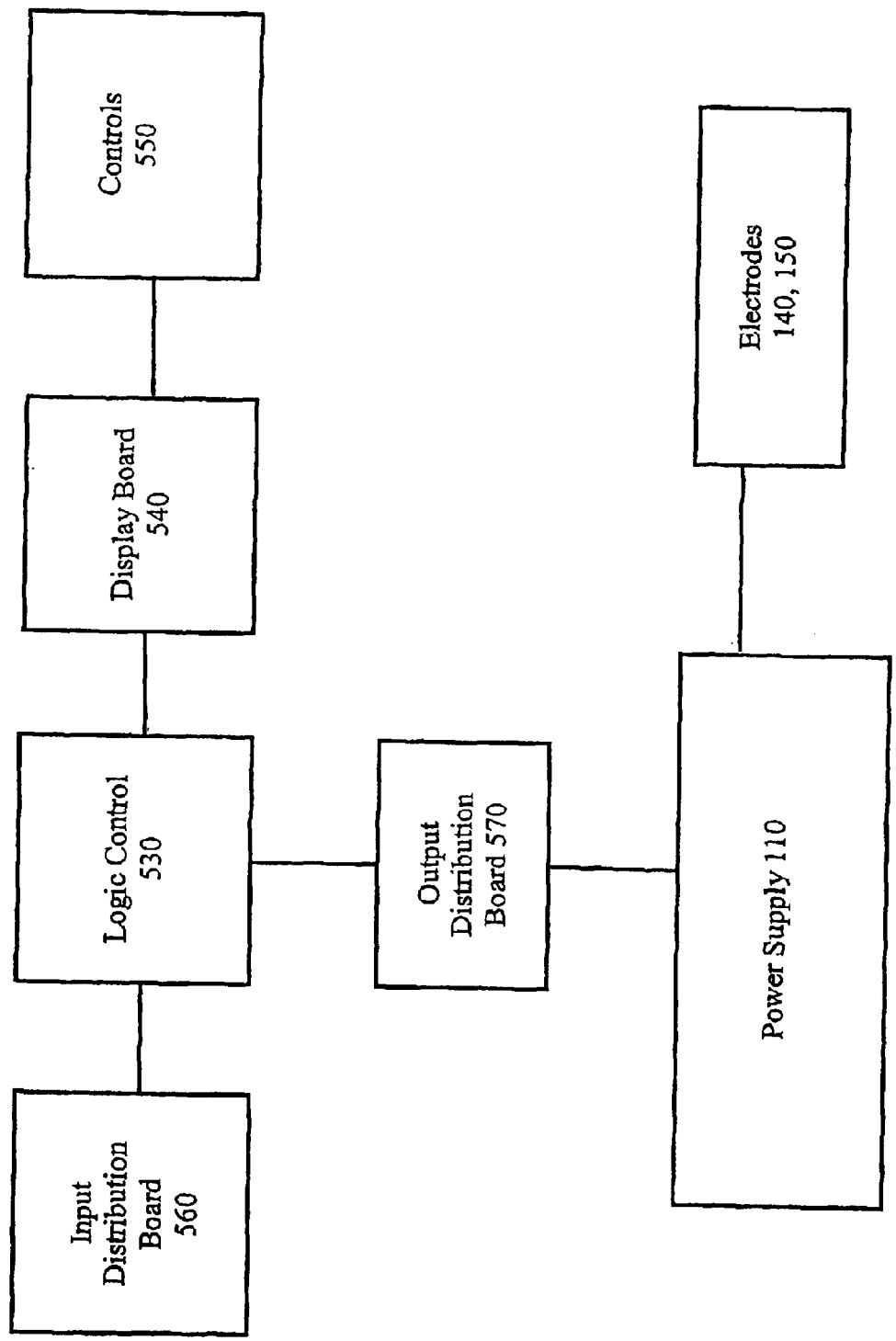
FIG. 5 is a schematic representation of a controller and associated power supply to for operation of a multiply selectable electrode array of FIG. 3 operating in the water treatment unit of FIG. 2.

FIG. 5 shows an example of an electrode and power supply in combination with supporting hardware, suitable for use in the described embodiment. A control board 550 is connected through a display board 540 to control logic 530. The logic control 530 receives input from the input distribution board 560 as well as the control board 550, and provides output to the display board 540 and via an output distribution board 570 to the power supply 110. The power supply 110 operates the electrodes 140, 150 under instruction from the control logic 530 as subsequently described in further detail. The electrodes are powered by terminals 612, 614.

Figure 6:
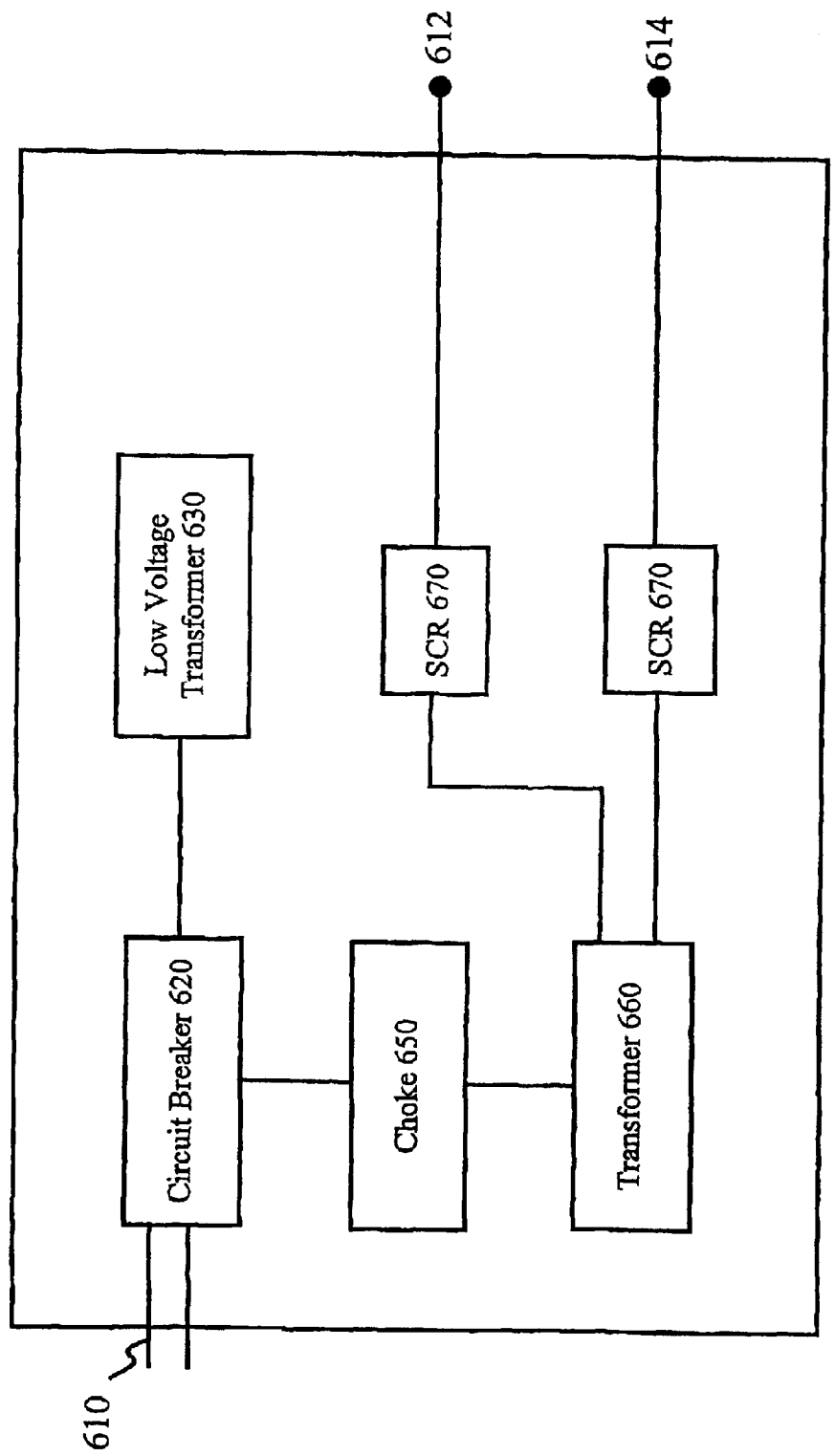
FIG. 6 is a schematic representation of a power supply of FIG. 5.

FIG. 6 illustrates the components of the power supply 110 of FIG. 5. Power is supplied by mains voltage 610 of an external power supply. The mains voltage 610 passes through a circuit breaker 620 from where it branches to a low voltage supply 630, which in this case is a transformer regulator which delivers the appropriate voltages to a distribution board which is distributed to the appropriate electronics/controls, and the main power supply for the unit.

A choke 650 and transformer 660 supplies a voltage to a set of SCRs 670, which both rectify the power and provide polarity changes as required. The voltage supplied to the electrodes is measured across the output. The current supplied to the electrodes is measured with reference to the series bar of known low resistance. Other methods of current sensing, eg, magnetic field monitoring, may also be used.

The measured output voltage at the output is sensed across the terminals 612 and 614 and fed to the microprocessor/logic control 530. The status of the system is displayed via the display board 540 and controlled via the controls 550. Power is distributed from the distribution board 560. Sensor signals are fed into the logic control 530 via sets of sensor wires (not shown) in the supply 110.

Polarity Reversal and pH Adjustment

Electrode clogging is one of the major problems preventing the proper functioning of existing electrolysis-based water treatment schemes. Clogging can occur by a minimum of two reactions, one in which electrically charged particles adhere to the electrodes, the other in which an oxide (or other insulating) layer forms on the surface of the electrodes.

The possibility of electrically charged particles adhering to the surface of the electrodes is more likely to occur if the water is at an extreme of pH (that is, well away from 7, eg less than 4 and greater than 10). It can be overcome by altering the pH to be close to pH 7. Some materials will still adhere to the electrodes even if the pH is close to 7. It is found that treating the water with iron before treating with aluminium electrodes overcomes some of this situation when aluminium is used as the major electrode treatment system.

It is found that polarity reversal helps drive off the accumulated material. In preferred operation, polarity reversal is performed at sufficiently short intervals that there is no large accumulation of material on the surface of the electrodes. Preferably, the polarity is reversed every few minutes for an appropriate length of time. As noted, the polarity is preferably reversed for between 0.1% and 30% of the duty cycle, more preferably between 2% and 25%. Generally, 10% polarity reversal is found to work well.

The desired amount of polarity reversal is related to water pH. The closer the pH is to the 6–7 range, the less reversal is required to prevent clogging. For extremes of pH, eg. $3.5<pH<5$ and $8<pH<9.5$, polarity reversals between 12.5% and 8.5%, preferably 10% are sought. In the pH range $5<pH<6$ and $7<pH<8$, polarity reversal for between 15% and 5% of the operating time is satisfactory. In the pH range, $6<pH<7$, polarity reversals of between 20% and 2% give satisfactory performance.

As mentioned above, a pH in the vicinity of 5.5 to 7 provides best results from the reaction, and it is desirable that the pH is within the range 3.5 to 9 before commencement of operation, if the starting pH is outside that range, with the preferred adjustment being between 5.5 and 7. Such adjustment can be done in either a pre-treatment tank, or in the main reactor tank which contains the electrodes.

An accumulation of an oxide on the surface of the active electrodes usually occurs at the anode because of the high generation of an oxide layer. This can be overcome by using the aluminium primarily as the anode. In this case, any oxide accumulation on the anode is removed by the dissolution of the surrounding material. When aluminium goes into solution at the anode, the reaction is one in which there is no accumulation of oxide (at least at pH less than 9). Should there be an oxide layer, the dissolution of the aluminium from around the oxide simply causes the oxide to fall off.

The use of an inert cathode, (for example "316 stainless steel") does not cause any blocking of the cathode because it is difficult to deposit onto the inert material and it causes the oxide layer on the surface of an aluminium anode to be sufficiently removed such that the aluminium anode and inert cathode set can continue to function as a suitable electrode set.

The use of electrodes in a single polarity mode, that is aluminium as anode and stainless steel as cathode causes accumulation over a period of time. As noted, it is found that this can be reduced by reversing the polarity for short time intervals. Reversing the polarity for between 0.1 percent (%) and 30% of the time of operation helps prevent this from occurring during the operational lifetime of the electrodes. Polarity reversals, in which the aluminium functions as cathode and the inert electrode as anode for time periods greater than 30% of the reaction time, has been found to still produce clogging due to oxide (hydroxide or similar) deposition.

Cumulative Charge Treatment

The present approach involves passing a certain amount of charge between the electrodes, irrespective of the water conductivity. By using a batch process, a certain amount of electrical charge is desirably passed, irrespective of how fast it is passed. It has been found that a suspension of 0.1% clay in water, 1 kilogram (kg) clay per kilolitre (kL), is desirably treated with approximately 50 anode amp hours (aAh) of electricity passed through an aluminium anode to clear the water within a period of a couple of hours. From calculations, it can be determined that this corresponds to approximately 15 gms of aluminium electrolytically dissolved into the 1 kL of water, if all the current goes to putting aluminium into solution.

A constant amount of current multiplied by time (amp hours) is suitable to achieve a particular quality of treated water. However maintaining a constant current under a wide range of conductivities is difficult. This effect can also be achieved using a variable current and measuring the current and time and summing the product until the appropriate level of passed charge has been reached. This can be achieved with some reasonable control over the power supply, but not one which is linear as far as voltage and current is concerned. It could be something as simple as a transformer choke combination for the power supply, in which case the voltage is dropped as the conductivity increases. Typically, such a combination will increase the current by a factor of four, as it drops the voltage by a factor of five, as the conductivity of the water increases by a factor of 20. This would enable the one power supply to handle water conductivity changes over a range of up to 20 in terms of conductivity change.

In the power supply used, the cumulative electric charge passed can be meaured with a capacitive device, or through digital integration of the instantaneous current delivered to the electrodes.

Electrode Arrays

A power supply measuring the current is only able to handle a certain variation in the conductivity range of the water. After that, there needs to be some change to the electrode array to handle greater conductivity changes. To achieve this, a system of variable electrodes can be used, as described earlier.

As the conductivity decreases, more electrodes can be switched into parallel, which lowers the resistance between the plates and gives a greater current for the same voltage. Alternatively, as the conductivity increases, electrodes are switched out, which gives less current for the same voltage. It may be desirable to deliver an electric current between a target range. The number of electrodes that can be switched in or out determines the variation factor which can be achieved by this technique. For example, if it is done with four sets of electrodes, the conductivity range can be increased by a factor of four. If eight sets are used, it can increase the range by a factor of eight.

This combination can be achieved further to the factor of 20 that can be achieved using the electronics control described above. If eight sets of electrodes are used, and a variation factor of 20 is achieved with the electronics control, this can result in a total variation of 160 in the conductivity of the water that can be treated. This is equivalent to being able to handle water conductivities between 50 $\mu$S/cm and 8 mS/cm. Alternatively, it may be that the conductivity range to be used is from 20 $\mu$S/cm to 3 mS/cm.

However, it may be preferable to use a factor of 50 for the conductivity, going from 30 $\mu$S/cm (typical conductivity of rainwater in country regions), through to 1.5 mS/cm (typical upper limit of conductivity of bore water considered useful for domestic/agricultural use). For small grey water treatment units, the range of water conductivity is typically between 100 $\mu$S/cm and 2 mS/cm and can be easily handled by this system.

Another alternative is that the power supply is unrestricted in terms of current flow and that it is controlled by the number of electrodes used. The components used are of sufficient capability to handle the heaviest current and it is regulated only by switching more electrodes in or out of the circuit. Monitoring of the voltage and current would be required and the unit switched off if the current became too large or the voltage too low.

While the electrode voltage control will be automatic, the swapping of electrodes will be able to be done either manually, as determined necessary by indicators and using switches, or done automatically, using software and relays. The latter is more effective and transparent to the user, but necessarily costs more. The former option may be preferred for industrial installations and in any situation where large currents are involved.

With a suitable choice of power supply settings, it is possible to use different programs to control the different electrodes. For example, the iron electrodes could have the polarity reversed every few minutes, while the aluminium electrodes were reversed for only 10 to 25% of the reaction time. Different sets of electrodes can be used for different applications.

It can be advantageous to continually monitor the voltage across the electrodes so that the unit can be stopped if the voltage gets below a certain predetermined value, which is determined by the number of electrodes in series. The unit should stop only when this voltage gets too low. If the current gets too low, the unit should send out a flag, but should otherwise keep counting, again stopping only if the time for processing is beyond the ability of the system to count.

Power Supply Considerations

In summary, it is found that a power supply 110 preferably operates under the following conditions:
a) allowing the power supply to output the maximum current possible for the electrode combination and water conductivity and measuring the current passed between the electrodes;
b) placing a power limiting device such as a choke on the input to the power supply, such that as the current increases, the voltage drops, reducing the current being passed; and
c) monitoring the voltage across the electrodes, and turning the power off to stop the process once the power drops below a predetermined value.

It is observed that the voltage used is desirably at least, for example, 4 V, in order to suitably facilitate the electrode reactions. Using a voltage power supply of, for example, 30 volts, allows the applied voltage to vary considerably.

For a given voltage and electrode array, the current passed is approximately proportional to the conductivity of the water. Attempting to maintain a constant current for a given electrode array, when the conductivity can vary by a factor of several hundred places significant restrictions on the voltage to be applied—it must be able to vary over a range of a factor of several hundred. As this is impractical, it is usually overcome by making a combination of electrode/power supply which is dedicated to the conductivity of the particular application.

As noted above, the total charge that has passed can be measured, the product of current multiplied by time or, more generally, the integral of the current over time can be determined. In this manner, the current supplied can be the maximum available to the particular power supply under the given conditions and should the current vary as the conductivity varies, this is compensated for by changing the time during which the reaction occurs. This whole process can be easily automated.

This in itself still places great restrictions on the power supply because, instead of it having to handle a wide range of voltages, it must now be able to handle a wide range of electrical currents, with the current varying with the conductivity of the water.

As noted above, if the power available from the supply is controlled in an appropriate manner, variations in the conductivity can be compensated by variations in both current and voltage. Conditions for maximum power can be achieved by such simple steps as including an appropriately chosen choke (ballast) with the transformer used in the supply. As the conductivity of the water increases, the current through the transformer and choke increases, making the effect of the choke that of restricting the current. This automatically lowers the voltage, lowering the current that will flow under that particular conductivity.

In application, it is found that with a suitable choice of transformer and choke, it is possible to deal with changes in water conductivity which vary by a factor of approximately 15, or more. For example, a 30 V transformer with a 0.5 H choke will restrict the maximum power to 91 W, and have a secondary voltage and current range (above 4 V) of between 2 A at 25 volts through to 8 A at 10 V to 12 A at 6 V. Allowing for a drop of 2 V through the circuit and rectifier, this corresponds to a circuit resistance range between 11 $\Omega$ to 0.4 $\Omega$. All up, this corresponds to a useful range of a factor of over 20. If we allow the minimum voltage to be only 8 V, this corresponds to a range of 10.

Typically a transformer can be used having the specifications 30 V, 15 A, 100 VA core, with a mains choke of 0.5 H with a current capability of 2 A. This provides an ability to handle a conductivity range from between 10 $\Omega$ to less than 0.5 $\Omega$. While the current at the lower resistance values will be adequate, the current at the higher values will be relatively low.

When the electrode array is near to the lower limit of conductivity, that is, there is little current being passed, the choke limiting the current could be switched out. Alternatively, the tappings on a mains transformer could be changed so as to increase or decrease the voltage put out by the transformer. In this manner, the change in the number of electrodes and also the selection of a voltage can be all that is used to limit the current for a particular conductivity, making the use of any current limiting device unnecessary.

However this voltage range varies the current considerably with changes in the conductivity of the water. In order to achieve the typically desired 50 anode amp hours (aAh) per kilo litre (kL) we can use a constant current for a known time. If the conductivity is too high, maintaining a constant current lowers the voltage too much for a small increase in conductivity. For example, if a particular electrode set required 28 V to pass 10 A for a water conductivity of 100 $\mu$S/cm, it would require a voltage of only 4 V to pass 10 A at a conductivity of 700 $\mu$S/cm. If it is decided that the lower range of acceptable voltage is 4 V, such a system can only handle a change of conductivity by a factor of 7, out of a total possible variation of over 1000.

Electrode Materials

The inert cathode can be fabricated from any suitable material, for example, 316 grade stainless steel, copper, mild steel, platinum coated titanium, nickel coated mild steel, silicon impregnated mild steel. Any material that does not readily form aqueous ions is generally suitable for use as an inert electrode. Similarly, the sacrificial anode can also be fabricated from any suitable material, for example, aluminium, iron, copper, magnesium. Polarity reversal can extend the operating life of such electrodes until such a time as they are effectively worn out through sacrificial operation, rather than being rendered effectively inoperative prior to sacrificial consumption.

Iron Pre-treatment

Pre-treatment with iron generally reduces the amount of aluminium treatment subsequently required, in most cases. This can be either done in the tank as a preliminary step to the main process, or in a separate tank prior to processing in the main reactor tank. The pre-treatment with iron in the manner outlined, can help reduce the overall cost of the process. It can react with materials not easily reacted with by aluminium.

The use of aluminium removes the residual iron during its normal operation. Often times other metals are useful, for example: copper to kill bacteria or algae. The application of copper can kill these organisms before they are processed, making their removal somewhat easier. In the case of stored water such as grey water waiting to be processed, the addition of copper can prevent the bacteria from multiplying, and thus further contaminating the water.

Variations to Described Embodiments

Electrode selection can be done using relays, silicon controlled rectifier (SCR) arrays or any other suitable switching means. With multiple electrodes selectable and all controllable through a measured current device, it is possible to use the one power supply to control all electrode sets.

SCRs could be used for both polarity reversal as well as voltage rectification. To operate with greater power, one only needs to use SCRs that can handle a greater current as well as supply a greater power transformer/choke combination and a different value shunt to determine the current being passed.

Parallel plates are preferably used as they provide an efficient use of power. Other shapes require greater voltage (and therefore greater power) to drive the same current. In this context, the term parallel can include approximately parallel plates as well as (approximately) concentric cylinders or an approximately central rod within a cylinder. These plates can be connected in a variety of different combinations. Preferably, plates are connected in parallel, in which case the passage of electric current results in only one quantity of reactions for each quantity of current passing through the electrodes. This has the disadvantage that large current capacity power supplies are required at low voltages to get sufficient reaction to occur.

However, if sets of electrodes are connected in series, the current passes through each set, multiplying the effect by the number of electrodes used. In this manner, the same reaction is produced by a higher voltage power supply. This is advantageous because it is easier to generate and control a higher voltage power supply than a higher current power supply. A design configuration is possible in which electrodes can be pre-wired in different combinations before being installed, with each configuration being preferred for a given conductivity range. In that manner, the one set of electrodes can also be used over a slightly different conductivity range.

A set of copper electrodes in a tank could be activated, which would kill some of the bacteria in water plus render the arsenates insoluble. After suitable processing, the copper electrodes would be turned off and aluminium/stainless steel electrodes activated. This would remove the remaining pollutants as well as the insoluble arsenates. The copper could also be used to kill algae before removing it and other pollutants using the aluminium/stainless steel electrodes.

Alternatively, iron could be used to condition paint waste water prior to removal using aluminium electrodes. Similarly, treatment with iron could break down the emulsified fats, oils and greases (FOGs), and the remainder of the material is removed by aluminium electrodes. Iron could be used in place of copper to treat arsenate containing water. It could also be used to treat cyanide waters prior to their removal using the aluminium electrodes. The whole reaction is preferably carried out in the one tank, saving time and money.

It should be noted that in a system in which there are more than one set of electrode feed throughs available, able to be controlled by the one power supply, it is possible to put sets of different electrodes into the same reaction chamber. In this case, it is possible to have one set of electrodes composed of iron and another set of stainless steel and aluminium. Whenever it was necessary to treat water with two different sets of electrodes, this could be done in the one tank. For example, the treatment of water containing emulsified FOGs requires pre-treatment using iron electrodes, which breaks up the emulsion and removes some of the contaminants, followed by a second treatment with aluminium electrodes to remove most of the remaining pollutants. This could now be done in the one tank. Similarly, in the treatment of paints and other materials. The iron electrodes would be turned on for a while, followed by further treatment using the aluminium electrodes.

By the appropriate choice of electrodes and settings, it is possible to use the one reactor tank to remove a wider range of pollutants than can be handled by any other single method. These possibilities become available if automatically selectable electrodes are used.

A set of selectable electrodes can be used and the number of electrodes adjusted automatically or manually to match the conductivity of the water. The voltage is then adjusted or monitored so that an appropriate electric current flows through the electrodes. The electrodes are reversed as required, typically between 0.1% and 30% of the reaction time, the current measured and the product of current times time calculated. It is found that polarity reversal for, for example, 50% of the time, does not prevent electrode clogging due to oxide type buildup. The flow rate of the water through the reaction chamber is adjusted so as to give the appropriate reaction for a given volume of water.

This ensures that the amount of treatment given to the water is adequate for the degree of pollution encountered. In this case, the operator sets the amount of treatment required, with greater anode amps hours used for more polluted water, less for water with lower pollutant levels. The system then automatically adjusts the flow rate so that the water is treated to the correct amount every time. This can be done in a small reaction chamber, where the water is in and out within a few seconds and the coagulation reaction and/or pollutant removal occurs in an outside chamber. Or it can occur in a larger chamber where the water stays longer and the reaction occurs inside the same chamber. In this latter case, the water can pass directly into the filter without occupying any further space. Alternatively, with a large enough chamber, the reaction and pollutant removal can occur in the one chamber without the need for the use of a filter.

Control of the pumps that pass the water through the reactor can be in discrete bursts, as well as via a continuous flowing pump. In this case in both of the above situations, the water would be pumped into the chamber and controlled by the same electronics and electrode system as described above. The water would then be processed for a particular reaction—anode amp hours per kilo litre (aAh/kL), or whatever. Again the current would be measured and the product of current times time recorded. At the conclusion of a particular current times time, a predetermined amount of water would be pumped in, displacing some or all of the water already in the reactor. For efficient operation, it would be best to displace a fraction, approximately 50% or less, and use the remaining water as a buffer for the incoming water. It will be apparent to anyone skilled in the art that the operation of the electrodes and the pumping could be carried out either separately or jointly and the results would not be greatly different. Although less than 50% is desirable, pumping out 100% of the volume of the water being processed is of course possible. Indeed measuring the volume of water pumped and stopping the pumps occasionally to allow the electrodes to process the water adequately is almost equivalent to a continuous process. It is desirable for the system to stop if the rate at which the electrodes process the water is faster than the rate at which the water can be pumped through the system, to avoid unnecessary over processing of the treated water.

In any case it is desirable that the electrodes are of a type in which the number is controlled—manually or automatically—according to the conductivity of the water. The number of electrodes can also be controlled according to the amount of water passing through the reaction chamber, to match the rate at which the electrolysis reaction generates the flocculating ions. This is done by measuring the current times time (that is, charge) and controlling the amount of water flowing through the system by either controlling the pump rate or pumping a given volume of water after a given amount of charge had passed.

There are a number of other features that can be added, if required. As examples, these include:

Automatic stopping features if the voltage gets too low;
Warnings if the time to process is too long;
Warnings if the electrodes are getting worn out—based upon the time taken for the reaction being too long.

The described embodiment provides a versatile electroflocculation system in which one reactor tank can be used to handle a wide range of different water conductivities, containing different pollutants. Water is pumped into the reactor tank, the electrodes are activated, the particulate contaminants removed from the top and the cleaned water pumped out.

Other removal techniques can additionally be used, including for example the use of a chemical to increase the floc level at the surface, as is currently employed in DAF (dissolved air flotation). Such a method allows the use of only iron electrodes to generate an iron flocculating agent, while also capturing the material generated. Other techniques can also be used, such as raising the level of the water to cause the flocculated material to overflow a weir wall for subsequent waste collection.

However, in many situations, the water could flow into one compartment where it would be treated and the pollutants floated to the surface from where they would be periodically removed by any process. The addition of extra water in the form of continuous flow would result in the water flowing from one tank to another past some sort of barrier. In this second stage, the water could either stand for a given period, or be treated by a second set of electrodes. After this, the water would flow again into a third region past a barrier. There settling of the water would occur and the final flow of water out of the system would take place. Further reaction or settling compartments could be used. It is of course desirable that water be sent through each particular compartment and not be able to bypass the reaction region.

In this case, the flow of water would be controlled so that it approximately matches the treatment required. If, for example, a particular type of water required 80 anode amp hours per kilolitre of water to be treated, it would need to have the flow rate adjusted so that 1 kL of water would flow through for each 80 anode amp hours of current set up. Using the system described above, this process would not require any monitoring because changes in conductivity of the water could be compensated by changes to the flow rate of the water.

Alternatively, the speed of the throughput could be controlled by the current being passed. This could involve use of a servo mechanism in which a pump or throttle is controlled by the rate at which current is being passed through the electrodes. There are various existing techniques by which such a result would be obtained.

It is desirable that the amount of current flow is controlled by either the electrode array or power supply or both as mentioned above. In this manner, the water will be treated to the extent required, irrespective of the conductivity of the water. This ideally produces a consistent result without the need for human intervention.

It is important that the speed of water throughput be controlled by the current through the electrodes and a preset value. If it is desired to treat the water further, it is merely necessary to slow down the rate at which the water flows through the system. This would require intelligent control in which the final throughput of water is controlled by both a predetermined dose rate, plus the rate at which the current flows. Water flow would be slowed down if it was determined that a greater dose was required (and sped up if a lower dose rate was required). It would also be slowed down if the conductivity of the water decreased (ie, less current was being passed) and increased as the conductivity increased (ie, more current was being passed).

The described scheme would enable such a system to be automatically controlled to take into consideration changes in the conductivity of the water and changes in the degree of pollution of the water. If the water was of high pollution level, the pumps would be slowed down so that there was a longer reaction time in the tank. If the conductivity decreased and less current flowed, the pump would slow down further so that there was still sufficient reaction tome to get the appropriate reaction to occur. In this manner the operator selects the amount of pollutant considered to be in the water and the appropriate reaction required. The electronics then takes over and automatically adjusts for changes in conductivity of the water. This provides an automatic dosing system which does not need continuous observation and change as conductivity changes.

While the use of a transformer choke combination is the simplest method of limiting the power, any arrangement which reduces the voltage as the current increases would be equally acceptable. For example, pulse modulation scheme could be used. Indeed, a combination of pulse modulation and transformer choke operation may increase the ability of the system to handle a wider conductivity range. Alternatively, such may be done with a tapped choke, or any combination thereof.

It is understood that the invention is not limited to any one of the embodiments described, but that various alterations and modifications, as would be apparent to one skilled in the art, are included within the scope of the invention.

What is claimed is:

1. A method of treating water, the method comprising the steps of:
   providing one or more pairs of electrodes, and immersing the one or more pairs of electrodes in water to be treated;
   delivering an instantaneous electric current determined by the instantaneous conductivity of the water via the one or more pairs of electrodes to the water, whereby sacrificial ones of the electrodes provide dissolved ions to assist in treating the water to remove contaminants; and
   monitoring a cumulative amount of charge passed through the water, the cumulative amount of charge being indicative of a degree to which the water has been treated.

2. A method as claimed in claim 1, wherein a said volume of water is treated, and the method comprises the further step of stopping the electric current when the cumulative amount of charge reaches a predetermined amount of charge.

3. A method as claimed in claim 2, wherein said predetermined amount of charge is determined empirically based on the relative mass of contaminants in a volume of water.

4. A method as claimed in claim 3, comprising the further step of separating said contaminants from said volume of water after having stopped said electric current.

5. A method as claimed in claim 1, wherein said electric current is limited by a maximum current that can be provided by a supplying power supply.

6. A method as claimed in claim 1, wherein the number of said pairs of electrodes is selectively varied depending upon the conductivity of the volume of water being treated so that the electric current is generally maintained within a range of values.

7. A method as claimed in claim 6, wherein a relatively greater number of pairs of electrodes are selected for a relatively lower water conductivity.

8. A method as claimed in claim 7, comprising the further step of periodically reversing the direction of the electric current to discourage clogging of said sacrificial electrodes.

9. A water treatment unit apparatus comprising:
   a tank for receiving water to be treated;
   one or more pairs of electrodes provided within the tank for immersion in the water;
   a power supply to deliver an instantaneous electric current determined by the instantaneous conductivity of the water through the pairs of electrodes to the water, whereby sacrificial ones of the electrodes provide dissolved ions to assist in treating the water to remove contaminants; and
   means for monitoring the cumulative electric charge delivered by the electric current, the cumulative amount of charge being indicative of a degree to which the water has been treated.

10. A water treatment unit apparatus as claimed in claim 9, wherein a given volume of water is treated in said tank, and said power supply stops delivering said electric current when the cumulative amount of charge reaches a predetermined amount of charge.

11. A water treatment unit apparatus as claimed in claim 10, wherein said predetermined amount of charge is determined empirically based on the relative mass of contaminants in a volume of water.

12. A water treatment unit apparatus as volumes in claim 11, further comprising means for separating said contaminants from said volume of water after said electric current having been stopped.

13. A water treatment apparatus as claimed in claim 9, wherein said power supply has an in-line choke on its input that acts to limit the maximum current that can be provided, thus providing an upper limit to the electric current.

14. A water treatment apparatus as claimed in claim 9, wherein said pairs of electrodes are adapted to be selectively connected to vary their number depending upon the conductivity of the water being treated.

15. A water treatment apparatus as claimed in claim 14, wherein a relatively greater number of pairs of electrodes are selected for a relatively lower water conductivity.

16. A water treatment apparatus as claimed in claim 15, wherein the power supply is able to periodically reverse the direction of the electric current to discourage clogging of the sacrificial electrodes.

* * * * *